United States Patent
McNestry

(10) Patent No.: US 8,317,421 B2
(45) Date of Patent: Nov. 27, 2012

(54) TAPE DRIVE TENSION CONTROL

(75) Inventor: Martin McNestry, Heanor (GB)

(73) Assignee: Videojet Technologies (Nottingham) Limited, Nottingham (GB)

( * ) Notice: Subject to any disclaimer, the term of this patent is extended or adjusted under 35 U.S.C. 154(b) by 1184 days.

(21) Appl. No.: 12/058,829

(22) Filed: Mar. 31, 2008

(65) Prior Publication Data

US 2008/0240830 A1  Oct. 2, 2008

Related U.S. Application Data

(60) Provisional application No. 60/909,742, filed on Apr. 3, 2007.

(30) Foreign Application Priority Data

Mar. 31, 2007 (GB) .................................. 0706358.9

(51) Int. Cl.
  *B41J 33/16* (2006.01)
  *B65H 23/04* (2006.01)
(52) U.S. Cl. ..... 400/234; 400/236; 242/334; 242/352.1; 242/413; 242/420.5
(58) Field of Classification Search .................. 400/236
  See application file for complete search history.

(56) References Cited

U.S. PATENT DOCUMENTS

| | | | |
|---|---|---|---|
| 3,584,805 A | 6/1971 | Lee | |
| 3,606,201 A | 9/1971 | Petusky | |
| 3,610,496 A | 10/1971 | Parker | |
| 3,704,401 A | 11/1972 | Miller | |
| 3,781,490 A | 12/1973 | Phillips | |
| 3,836,831 A | 9/1974 | Van Heelsbergen | |
| 3,863,117 A | 1/1975 | Paschetto | |
| 3,889,893 A | 6/1975 | Silverman et al. | |
| 3,902,585 A | 9/1975 | Mogtader | |
| 3,910,527 A | 10/1975 | Buhler et al. | |
| 3,982,160 A | 9/1976 | Goldschmidt et al. | |

(Continued)

FOREIGN PATENT DOCUMENTS

CN  1473110 A  2/2004

(Continued)

OTHER PUBLICATIONS

Burke et al, Switchable Stepper Motor Control, IBM Technical Disclosure Bulletin, Nov. 1989, pp. 430-431, vol. 32, No. 63.

(Continued)

*Primary Examiner* — Jill Culler
(74) *Attorney, Agent, or Firm* — Beusse Wolter Sanks Mora & Maire, P.A.

(57) ABSTRACT

A tape drive comprising two motors, two tape spool supports on which spools of tape may be mounted, each spool being drivable by a respective one of the motors, and a controller. The controller controls the energization of the motors such that the tape may be transported in at least one direction between spools mounted on the spool supports. The controller is configured to store a plurality of motor control data items, each data item being associated with a respective tension value. The controller is operative to monitor tension in a tape being transported between spools mounted on the spool supports; read a motor control data item based upon the monitored tension; generate a motor control signal based upon the read motor control data item; and apply the motor control signal to at least one of the motors.

16 Claims, 3 Drawing Sheets

U.S. PATENT DOCUMENTS

| | | | |
|---|---|---|---|
| 3,984,809 A | 10/1976 | Dertouzos et al. | |
| 4,000,804 A | 1/1977 | Zaltieri | |
| 4,012,674 A | 3/1977 | Spitsbergen et al. | |
| 4,015,799 A | 4/1977 | Koski et al. | |
| 4,025,830 A | 5/1977 | Delaporte | |
| 4,079,828 A | 3/1978 | Babler | |
| 4,091,913 A | 5/1978 | Ku et al. | |
| 4,093,149 A | 6/1978 | Shroff et al. | |
| 4,094,478 A | 6/1978 | Shroff et al. | |
| 4,095,758 A | 6/1978 | Shroff | |
| 4,096,417 A | 6/1978 | Chambolle | |
| 4,156,257 A | 5/1979 | Roberts | |
| 4,161,001 A | 7/1979 | Sakamoto | |
| 4,177,731 A | 12/1979 | Kleist et al. | |
| RE30,448 E | 12/1980 | Shroff | |
| 4,256,996 A * | 3/1981 | Brooks et al. | 318/7 |
| 4,266,479 A | 5/1981 | Mahoney | |
| 4,286,888 A | 9/1981 | Bennett et al. | |
| 4,294,552 A | 10/1981 | Mako | |
| 4,313,376 A | 2/1982 | Swope et al. | |
| 4,313,683 A | 2/1982 | Brown et al. | |
| 4,354,211 A | 10/1982 | Gilovich et al. | |
| 4,366,371 A | 12/1982 | d'Alayer de Costemore d'Arc et al. | |
| 4,375,339 A | 3/1983 | Dyer | |
| 4,398,227 A * | 8/1983 | Anderson | 242/334.3 |
| 4,400,745 A * | 8/1983 | Shu | 360/73.08 |
| 4,448,368 A | 5/1984 | Skalko | |
| 4,461,433 A * | 7/1984 | Kani | 242/412.3 |
| 4,479,081 A | 10/1984 | Harris | |
| 4,525,654 A * | 6/1985 | Tajima et al. | 318/7 |
| 4,573,645 A | 3/1986 | Harris, Jr. | |
| 4,577,198 A | 3/1986 | Hibino et al. | |
| 4,589,603 A | 5/1986 | Muller | |
| 4,632,582 A | 12/1986 | Houston | |
| 4,639,880 A | 1/1987 | Yasuhiro | |
| 4,642,655 A | 2/1987 | Sparer et al. | |
| 4,650,350 A | 3/1987 | Dorner | |
| 4,664,336 A | 5/1987 | Koyama | |
| 4,696,439 A | 9/1987 | Sukigara et al. | |
| 4,712,113 A | 12/1987 | Brooks et al. | |
| 4,752,842 A | 6/1988 | Odagiri | |
| 4,760,405 A | 7/1988 | Nagira et al. | |
| 4,786,992 A | 11/1988 | Tajima et al. | |
| 4,788,558 A | 11/1988 | Caldwell et al. | |
| 4,895,466 A | 1/1990 | Hartman et al. | |
| 4,897,668 A | 1/1990 | Nagato et al. | |
| 4,909,648 A | 3/1990 | Hartman et al. | |
| 4,924,240 A | 5/1990 | Herbert et al. | |
| 4,952,085 A | 8/1990 | Rein | |
| 4,953,044 A | 8/1990 | Van Pelt et al. | |
| 4,977,466 A | 12/1990 | Nakata | |
| 5,012,989 A | 5/1991 | Whyte, Jr. et al. | |
| 5,017,943 A | 5/1991 | Ogita et al. | |
| 5,039,027 A * | 8/1991 | Yanagihara et al. | 242/334.2 |
| 5,080,296 A | 1/1992 | Raggio et al. | |
| 5,121,136 A | 6/1992 | Kawakubo | |
| 5,125,592 A | 6/1992 | Sato | |
| 5,160,943 A | 11/1992 | Pettigrew et al. | |
| 5,162,815 A | 11/1992 | Hodge | |
| 5,218,490 A | 6/1993 | Sakamoto et al. | |
| 5,222,684 A * | 6/1993 | Yoneda et al. | 242/334.2 |
| 5,259,563 A | 11/1993 | Kakiwaki et al. | |
| 5,281,038 A | 1/1994 | Schofield et al. | |
| 5,295,753 A | 3/1994 | Godo et al. | |
| 5,297,879 A | 3/1994 | Oikawa | |
| 5,300,953 A | 4/1994 | Schulte | |
| 5,313,343 A | 5/1994 | Yatomi | |
| 5,330,118 A * | 7/1994 | Yoshikawa | 242/334.4 |
| 5,357,270 A | 10/1994 | Herbert | |
| 5,366,303 A | 11/1994 | Barrus et al. | |
| 5,372,439 A | 12/1994 | Poole et al. | |
| 5,415,482 A | 5/1995 | Poole et al. | |
| 5,477,400 A | 12/1995 | Kawamata | |
| 5,490,638 A | 2/1996 | Driftmyer et al. | |
| 5,505,550 A | 4/1996 | Kitahara et al. | |
| 5,529,410 A * | 6/1996 | Hunter et al. | 400/234 |
| 5,576,751 A | 11/1996 | Wada et al. | |
| 5,604,652 A | 2/1997 | Nishida et al. | |
| 5,609,425 A | 3/1997 | Kawano et al. | |
| 5,639,040 A | 6/1997 | Honjo | |
| 5,647,679 A | 7/1997 | Green et al. | |
| 5,649,672 A | 7/1997 | Wolff et al. | |
| 5,649,774 A | 7/1997 | Harding et al. | |
| 5,700,096 A | 12/1997 | Satoh et al. | |
| 5,701,214 A | 12/1997 | Inoue et al. | |
| 5,720,442 A | 2/1998 | Yanagihara et al. | |
| 5,731,672 A | 3/1998 | Miyaguchi | |
| 5,788,384 A | 8/1998 | Goodwin et al. | |
| 5,795,084 A | 8/1998 | Stone et al. | |
| 5,803,624 A | 9/1998 | Miazga et al. | |
| 5,816,719 A | 10/1998 | Palmer | |
| 5,820,280 A | 10/1998 | Fox | |
| 5,906,444 A | 5/1999 | Jorgensen | |
| 5,971,634 A | 10/1999 | Buckby et al. | |
| 5,993,092 A | 11/1999 | Palmer | |
| 6,000,868 A | 12/1999 | Watanabe et al. | |
| 6,036,382 A | 3/2000 | Middleton | |
| 6,046,756 A | 4/2000 | Iga et al. | |
| 6,082,914 A | 7/2000 | Barrus et al. | |
| 6,089,768 A | 7/2000 | Barrus et al. | |
| 6,128,152 A | 10/2000 | Mace | |
| 6,142,686 A | 11/2000 | Schanke et al. | |
| 6,164,203 A | 12/2000 | Keller | |
| 6,261,012 B1 | 7/2001 | Haas et al. | |
| 6,305,628 B1 | 10/2001 | Thompson et al. | |
| 6,305,629 B1 | 10/2001 | Chliwnyj et al. | |
| 6,307,583 B1 | 10/2001 | Randolph et al. | |
| 6,315,471 B1 | 11/2001 | Hsieh et al. | |
| 6,669,136 B2 | 12/2003 | Niioka et al. | |
| 6,754,026 B1 | 6/2004 | Koski | |
| 6,840,689 B2 | 1/2005 | Barrus et al. | |
| 6,969,064 B2 | 11/2005 | Ichikawa et al. | |
| 7,682,094 B2 * | 3/2010 | McNestry et al. | 400/223 |
| 2003/0049065 A1 | 3/2003 | Barrus et al. | |
| 2004/0041047 A1 | 3/2004 | Karp et al. | |
| 2004/0146331 A1 | 7/2004 | McNestry et al. | |

FOREIGN PATENT DOCUMENTS

| | | |
|---|---|---|
| DE | 4215830 | 11/1993 |
| EP | 0157096 | 10/1985 |
| EP | 0176009 | 4/1986 |
| EP | 0294633 | 12/1988 |
| EP | 0 329 478 A2 | 8/1989 |
| EP | 0481579 A2 | 10/1991 |
| EP | 0481579 | 4/1992 |
| EP | 0532238 | 3/1993 |
| EP | 0556066 | 8/1993 |
| EP | 0582285 | 2/1994 |
| EP | 0 589 715 | 3/1994 |
| EP | 0 683 055 | 11/1995 |
| EP | 0 734 876 | 10/1996 |
| EP | 0 741 044 A2 | 11/1996 |
| EP | 0 765 221 | 4/1997 |
| EP | 0 804 343 B1 | 11/1997 |
| EP | 0 830 252 B1 | 3/1998 |
| EP | 0 842 785 A1 | 5/1998 |
| EP | 0840311 | 5/1998 |
| EP | 0854480 | 7/1998 |
| EP | 0 861 735 | 9/1998 |
| EP | 0936078 | 2/1999 |
| EP | 0945273 | 9/1999 |
| EP | 0955178 | 11/1999 |
| EP | 1000756 | 5/2000 |
| EP | 1400362 | 3/2004 |
| EP | 1 409 388 | 4/2004 |
| EP | 1470926 | 10/2004 |
| FR | 2783459 | 3/2000 |
| FR | 9811893 | 3/2000 |
| GB | 1 361 288 | 7/1974 |
| GB | 1 576 750 | 10/1980 |
| GB | 2077970 | 12/1981 |
| GB | 2087104 | 5/1982 |
| GB | 2 163 915 | 3/1986 |
| GB | 2 175 253 | 11/1986 |
| GB | 2201013 | 8/1988 |

| | | |
|---|---|---|
| GB | 2 272 669 | 5/1994 |
| GB | 2289441 | 11/1995 |
| GB | 2 302 523 | 1/1997 |
| GB | 2 306 916 | 5/1997 |
| GB | 2 310 405 | 8/1997 |
| GB | 2 315 244 | 1/1998 |
| GB | 2 343 655 | 5/2000 |
| GB | 2 349 605 | 11/2000 |
| GB | 2354974 | 4/2001 |
| GB | 2 369 326 | 5/2002 |
| GB | 2376662 | 12/2002 |
| GB | 2400582 | 10/2004 |
| GB | 2400818 | 10/2004 |
| GB | 2404703 | 2/2005 |
| GB | 2404896 | 2/2005 |
| GB | 2416237 | 1/2006 |
| GB | 2 422 815 | 8/2006 |
| JP | 59-17125 | 1/1984 |
| JP | 60-157891 | 8/1985 |
| JP | S60-157891 | 8/1985 |
| JP | 60-211653 | 10/1985 |
| JP | 61-169265 | 7/1986 |
| JP | 63-104875 | 5/1988 |
| JP | 63-122045 | 5/1988 |
| JP | 63-317963 | 12/1988 |
| JP | 1-300455 | 12/1989 |
| JP | 4-274044 | 9/1992 |
| JP | 4-305486 | 10/1992 |
| JP | 05058014 | 3/1993 |
| JP | H5-58014 | 3/1993 |
| JP | A-H06-079938 | 3/1994 |
| JP | H6-134275 | 6/1994 |
| JP | A-H07-032692 | 2/1995 |
| JP | 08002078 | 1/1996 |
| JP | 08244324 | 9/1996 |
| JP | H8-244324 | 9/1996 |
| JP | 9-151011 | 6/1997 |
| JP | 10-181972 | 7/1998 |
| JP | 2000-229456 | 8/2000 |
| JP | 2004-181691 | 7/2004 |
| WO | WO 92/09517 | 6/1992 |
| WO | WO93/01055 | 1/1993 |
| WO | WO 95/34896 | 12/1995 |
| WO | WO96/14990 | 5/1996 |
| WO | WO 96/28304 | 9/1996 |
| WO | WO 96/32258 | 10/1996 |
| WO | WO97/35727 | 10/1997 |
| WO | WO97/35728 | 10/1997 |
| WO | WO 97/36751 | 10/1997 |
| WO | WO 99/34983 | 7/1999 |
| WO | WO99/46129 | 9/1999 |
| WO | WO 02/22371 | 3/2002 |
| WO | WO03011728 | 2/2003 |
| WO | WO 03/029013 | 4/2003 |
| WO | WO2006/069943 | 7/2006 |

OTHER PUBLICATIONS

Barnett, J.A., Use of Stepper Motor as Variable Load, IBM Technical Disclosure Bulletin, Apr. 1977, pp. 4120-4121, vol. 19, No. 11.
*Markem Corporation* v. *Zipher, Ltd. et al.*, Order, Sep. 1, 2009, pp. 1-2, Doc. 117, Case No. 07-cv-06-PB.
Datamax DMX 5000 ATB Printer, Maintenance Manual, Documentation P/N:88/0080-01, Revision B, Datamax Corporation, 1987, 1993.
*Markem Corporation* v. *Zipher, Ltd. et al.*, Order, Jan. 12, 2010, pp. 1-5, Doc. 125, Case No. 07-cv-06-PB.
University Physics, 9th Edition—Young Freedman, p. 308, 1996.

* cited by examiner

TAPE DRIVE TENSION CONTROL

CROSS-REFERENCE TO RELATED APPLICATIONS

This application claims priority to and is based on United Kingdom Application No. 0706358.9 filed Mar. 31, 2007, and incorporated herein by reference in its entirety.

In addition, this application claims priority to and is based on U.S. Provisional Application No. 60/909,742 filed Apr. 3, 2007, and incorporated herein by reference in its entirety.

BACKGROUND OF THE INVENTION

The present invention relates to a tape drive. Such a tape drive may form part of printing apparatus. In particular, such a tape drive may be used in transfer printers, that is, printers which make use of carrier-supported inks.

In transfer printers, a tape which is normally referred to as a printer tape and carries ink on one side is presented within a printer such that a printhead can contact the other side of the tape to cause the ink to be transferred from the tape on to a target substrate of, for example, paper or a flexible film. Such printers are used in many applications. Industrial printing applications include thermal transfer label printers and thermal transfer coders which print directly on to a substrate such as packaging materials manufactured from flexible film or card.

Ink tape is normally delivered to the end user in the form of a roll wound onto a core. The end user pushes the core on to a tape spool, pulls a free end of the roll to release a length of tape, and then engages the end of the tape with a further spool. The spools may be mounted on a cassette, which can be readily mounted on a printing machine. The printing machine includes a transport means for driving the spools, so as to unwind tape from one spool and to take up tape on the other spool. The printing apparatus transports tape between the two spools along a predetermined path past the printhead.

Known printers of the above type rely upon a wide range of different approaches to the problem of how to drive the tape spools. Some rely upon stepper motors operating in a position control mode to pay out or take-up a predetermined quantity of tape. Other known printers rely on DC motors operating in a torque mode to provide tension in the tape and to directly or indirectly drive the spools. Some known arrangements drive only the spool on to which tape is taken up (the take-up spool) and rely upon some form of "slipping clutch" arrangement on the spool from which tape is drawn (the supply spool) to provide a resistive drag force so as to ensure that the tape is maintained in tension during the printing and tape winding processes and to prevent tape overrun when the tape is brought to rest. It will be appreciated that maintaining adequate tension is an essential requirement for the proper functioning of the printer.

Alternative forms of known printer tape drives drive both the take-up spool and the supply spool. A supply spool motor may be arranged to apply a predetermined drag to the tape, by being driven in the reverse direction to the direction of tape transport. In such an arrangement (referred to herein as "pull-drag"), the motor connected to the take-up spool is arranged to apply a greater force to the tape than the motor connected to the supply spool such that the supply spool motor is over-powered and the supply spool thus rotates in the direction of tape transport. The supply spool drag motor keeps the tape tensioned in normal operation.

In a further alternative arrangement a supply spool motor may be driven in the direction of tape transport such that it contributes to driving the tape from the supply spool to the take-up spool. Such an arrangement is referred to herein as "push-pull". The take-up motor pulls the tape onto the take-up spool as tape is unwound by the supply spool motor such that tape tension is maintained. Such a push-pull arrangement is described in our earlier UK patent number GB 2369602, which discloses the use of a pair of stepper motors to drive the supply spool and the take-up spool. In GB 2369602 a controller is arranged to control the energisation of the motors such that the tape may be transported in both directions between spools of tape. The tension in the tape being transported between spools is monitored and the motors are controlled to energise both motors to drive the spools of tape in the direction of tape transport.

As a printer gradually uses a roll of tape, the outer diameter of the supply spool decreases and the outer diameter of the take-up spool increases. In slipping clutch arrangements, which offer an essentially constant resistive torque, the tape tension will vary in proportion to the diameter of the supply spool. Given that it is desirable to use large supply spools so as to minimise the number of times that a tape roll has to be replenished, this is a serious problem particularly in high-speed machines where rapid tape transport is essential. For tape drives that use both a take-up motor and a supply spool motor, the variation in spool diameters can make it difficult to determine the correct drive signal to be supplied to each motor such that tape tension is maintained, and/or that tape is unwound or rewound at the correct rate.

Given these constraints, known printer designs offer a compromise in performance by way of limiting the rate of acceleration, the rate of deceleration, or the maximum speed capability of the tape transport system. Overall printer performance has, as a result, been compromised in some cases.

Known tape drive systems generally operate in one of two manners, that is either continuous printing or intermittent printing. In both modes of operation, the apparatus performs a regularly repeated series of printing cycles, each cycle including a printing phase during which ink is being transferred to a substrate, and a further non-printing phase during which the apparatus is prepared for the printing phase of the next cycle.

In continuous printing, during the printing phase a stationary printhead is brought into contact with a printer tape the other side of which is in contact with a substrate on to which an image is to be printed. The term "stationary" is used in the context of continuous printing to indicate that although the printhead will be moved into and out of contact with the tape, it will not move relative to the tape path in the direction in which tape is advanced along that path. During printing, both the substrate and tape are transported past the printhead, generally but not necessarily at the same speed.

Generally only relatively small lengths of the substrate which is transported past the printhead are to be printed upon, and therefore to avoid gross wastage of tape it is necessary to reverse the direction of travel of the tape between printing operations. Thus in a typical printing process in which the substrate is travelling at a constant velocity, the printhead is extended into contact with the tape only when the printhead is adjacent to regions of the substrate to be printed. Immediately before extension of the printhead, the tape must be accelerated up to, for example, the speed of travel of the substrate. The tape speed must then be maintained at the constant speed of the substrate during the printing phase and, after the printing phase has been completed, the tape must be decelerated and then driven in the reverse direction so that the used region of the tape is on the upstream side of the printhead.

As the next region of the substrate to be printed approaches, the tape must then be accelerated back up to the normal printing speed and the tape must be positioned so that an unused portion of the tape close to the previously used region of the tape is located between the printhead and the substrate when the printhead is advanced to the printing position. Thus very rapid acceleration and deceleration of the tape in both directions is required, and the tape drive system must be capable of accurately locating the tape so as to avoid a printing operation being conducted when a previously used portion of the tape is interposed between the printhead and the substrate.

In intermittent printing, a substrate is advanced past a printhead in a stepwise manner such that during the printing phase of each cycle the substrate and generally but not necessarily the tape, are stationary. Relative movement between the substrate, tape and printhead are achieved by displacing the printhead relative to the substrate and tape. Between the printing phase of successive cycles, the substrate is advanced so as to present the next region to be printed beneath the printhead, and the tape is advanced so that an unused section of tape is located between the printhead and the substrate. Once again rapid and accurate transport of the tape is necessary to ensure that unused tape is always located between the substrate and printhead at a time that the printhead is advanced to conduct a printing operation.

The requirements of high speed transfer printers in terms of tape acceleration, deceleration, speed and positional accuracy are such that many known drive mechanisms have difficulty delivering acceptable performance with a high degree of reliability. Similar constraints also apply in applications other than high-speed printers, for instance drives used in labelling machines, which are adapted to apply labels detached from a label web. Tape drives in accordance with embodiments of the present invention are suitable for use in labelling machines in which labels are detached from a continuous label web which is transported between a supply spool and a take-up spool.

BRIEF DESCRIPTION OF THE INVENTION

It is an object of embodiments of the present invention to obviate or mitigate one or more of the problems associated with the prior art, whether identified herein or elsewhere. It is a further object of embodiments of the present invention to provide a tape drive which can be used to deliver printer tape in a manner which is capable of meeting the requirements of high speed production lines, although the tape drive of the present invention may of course be used in any other application where similar high performance requirements are demanded.

According to the present invention, there is provided, a tape drive comprising two motors, two tape spool supports on which spools of tape may be mounted, each spool being drivable by a respective one of said motors, and a controller for controlling the energization of the motors such that the tape may be transported in at least one direction between spools mounted on the spool supports, wherein the controller is configured to store a plurality of motor control data items, each data item being associated with a respective tension value, and the controller is operative to: monitor tension in a tape being transported between spools mounted on the spool supports, read a motor control data item based upon said monitored tension, generate a motor control signal based upon said read motor control data item, and apply said motor control signal to at least one of the motors.

The controller may be configured to processes the monitored tension and the predetermined target tension to determine an error signal. This processing may involve a subtraction operation. Having generated such an error signal the motor control data item may be obtained based upon the error signal.

The predetermined target tension may be a range of tension values, referred to as a so-called "deadband."

Having applied the motor control signal to at least one of the motors the controller may be configured to further monitor tape tension. At least one stored motor control data item may be modified based upon the further monitoring. Specifically, if it is determined that the motor control signal did not correctly adjust tape tension the motor control data item may be modified so as to improve future performance.

The controller may be configured to implement a configuration process, the configuration process being intended to store the motor control data items. Specifically, the process may involve determining relationships between changes in tension in the tape transported between the spools and motor control signals applied to the motors.

At least one of the motors may be a position controlled motor such as a stepper motor. Each of the motor control data items may represent an angular position adjustment, for example an adjustment in terms of a number of steps.

The controller may be adapted to energise both motors to drive spools of tape in the direction of tape transport. The controller may be configured to maintain tension in a tape between the spools between predetermined limits. The controller may be arranged to control the motor to transport tapes in both directions between the spools. That is, the tape drive may be bi-directional.

Means may be provided to monitor the power supplied to at least one of the motors and to monitor tape tension based upon the monitored power. The tape drive may further comprise means for determining diameters of spools of tape mounted on the spool supports.

A tape drive in accordance with some embodiments of the present invention relies upon both the motors that drive the two tape spools to drive the tape during tape transport. Thus the two motors may operate in push-pull mode. This makes it possible to achieve very high rates of acceleration and deceleration. Tension in the tape being transported may be set by control of the drive motors and therefore need not be dependent upon any components that have to contact the tape between the take-up and supply spools. Thus a very simple overall mechanical assembly can be achieved. Given that both motors contribute to tape transport, relatively small and therefore inexpensive and compact motors can be used.

The actual rotational direction of each spool will depend on the sense in which the tape is wound on each spool. If both spools are wound in the same sense then both spools will rotate in the same rotational direction to transport the tape. If the spools are wound in the opposite sense to one another, then the spools will rotate in opposite rotational directions to transport the tape. In any configuration, both spools rotate in the direction of tape transport. However, according to the operating mode of the supply spool motor, the direction in which it is driven may also be in the same direction as the supply spool (when the motor is assisting in driving the tape, by pushing the tape off the spool) or the supply spool motor may be driven in the opposite direction to that of the supply spool (when the motor is providing drag to the tape in order to tension the tape).

The tape drive may be incorporated in a transfer printer for transferring ink from a printer tape to a substrate, which is transported along a predetermined path adjacent to the printer. The tape drive acts as a printer tape drive mechanism for transporting ink ribbon between first and second tape spools, and the printer further comprising a printhead arranged to contact one side of the ribbon to press an opposite side of the ribbon into contact with a substrate on the predetermined path. There may also be provided a printhead drive mechanism for transporting the printhead along a track extending generally parallel to the predetermined substrate transport path (when the printer is operating in an intermittent printing mode) and for displacing the printhead into and out of contact with the tape. A controller controls the printer ink ribbon and printhead drive mechanisms, the controller being selectively programmable either to cause the ink ribbon to be transported relative to the predetermined substrate transport path with the printhead stationary and displaced into contact with the ink ribbon during printing, or to cause the printhead to be transported relative to the ink ribbon and the predetermined substrate transport path and to be displaced into contact with the ink ribbon during printing.

The drive mechanism may be bi-directional such that tape may be transported from a first spool to a second spool and from the second spool to the first. Typically, unused tape is provided in a roll of tape mounted on the supply spool. Used tape is taken up on a roll mounted on the take-up spool. However, as described above, in order to prevent gross ribbon wastage, after a printing operation the tape can be reversed such that unused portions of the tape may be used before being wound onto the take-up spool.

BRIEF DESCRIPTION OF THE DRAWINGS

Embodiments of the present invention will now be described, by way of example, with reference to the accompanying drawings in which.

DETAILED DESCRIPTION OF THE INVENTION

Figure 1:
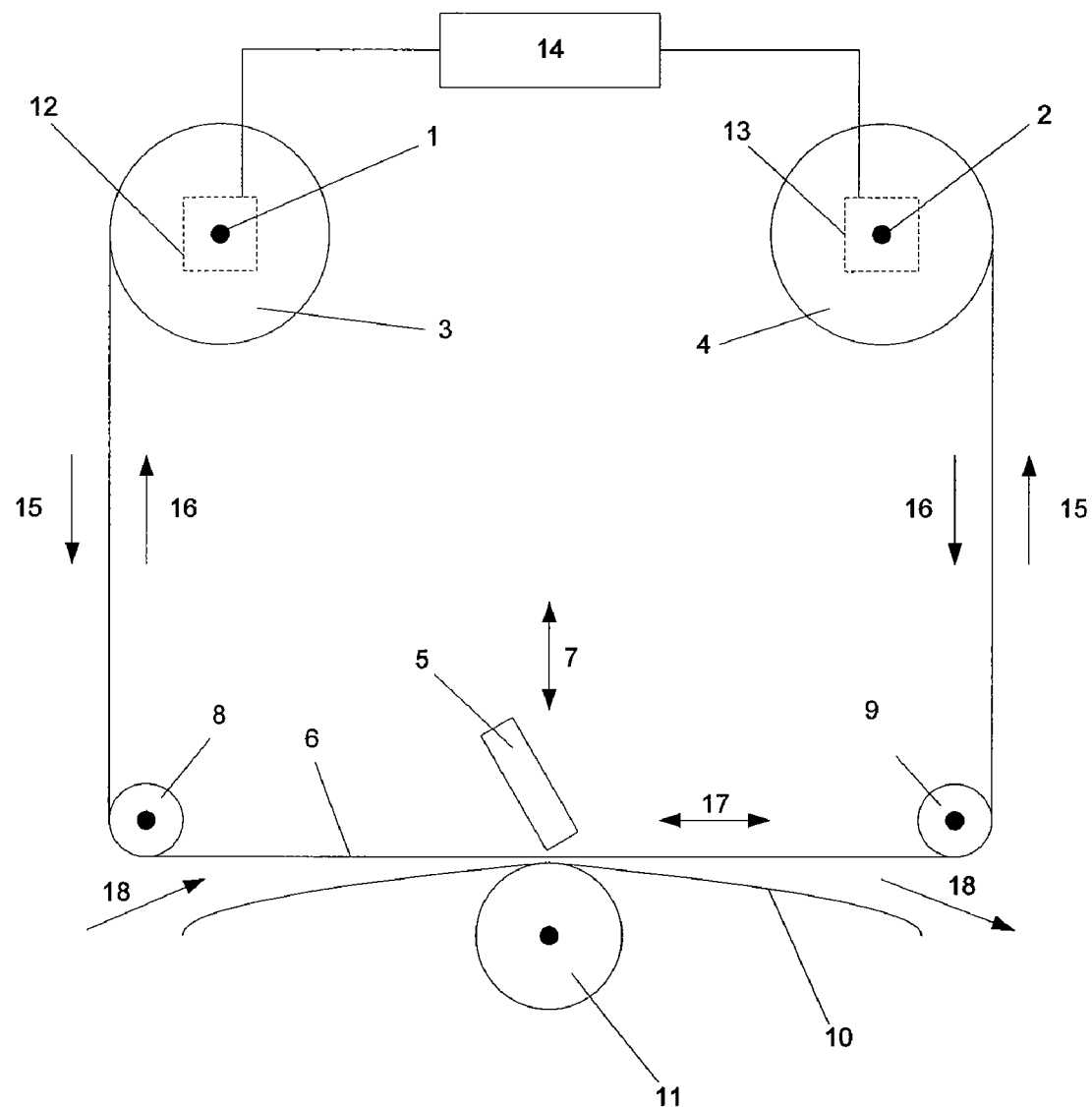
FIG. 1 is a schematic illustration of a printer tape drive system in accordance with an embodiment of the present invention.

Referring to FIG. 1, this schematically illustrates a tape drive in accordance with the present invention suitable for use in a thermal transfer printer. First and second shafts 1, 2 support a supply spool 3 and a take-up spool 4 respectively. The supply spool 3 is initially wound with a roll of unused tape, and the take-up spool 4 initially does not carry any tape. As tape is used, used portions of the tape are transported from the supply spool 3 to the take-up spool 4. A displaceable printhead 5 is provided, displaceable relative to tape 6 in at least a first direction indicated by arrow 7. Tape 6 extends from the supply spool 3 around rollers 8, 9 to the take-up spool 4. The path followed by the tape 6 between the rollers 8 and 9 passes in front of the printhead 5. When printing is to take place, a substrate 10 upon which print is to be deposited is brought into contact with the tape 6 between rollers 8 and 9, the tape 6 being interposed between the printhead 5 and the substrate 10. The substrate 10 may be brought into contact with the tape 6 against a platen roller 11.

The supply shaft 1 is driven by a supply motor 12 and the take-up shaft 2 is driven by a take-up motor 13. The supply and take-up motors 12, 13 are illustrated in dashed outline, indicating that they are positioned behind the supply and take-up spools 3, 4. It will however be appreciated that in alternative embodiments of the invention, the spools are not directly driven by the motors. Instead the motor shafts may be operably connected to the respective spools by a belt drive or other similar drive mechanism.

A controller 14 controls the operation of motors 12, 13 as described in greater detail below. The supply and take-up motors 12, 13 are capable of driving the tape 6 in both directions. Tape movement may be defined as being in the print direction if the tape is moving from the supply spool 3 to the take-up spool 4, as indicated by arrows 15. When tape is moving from the take-up spool 4 to the supply spool 3, the tape may be considered to be moving in the tape reverse direction, as indicated by arrows 16.

When the printer is operating in continuous mode the printhead 5 will be moved into contact with the tape 6 when the tape 6 is moving in the print direction 15. Ink is transferred from the tape 6 to the substrate 10 by the action of the printhead 5. Tape movement may be reversed such that unused portions of the tape 6 are positioned adjacent to the printhead 5 before a subsequent printing operation is commenced.

In the configuration illustrated in FIG. 1, the spools 3, 4 are wound in the same sense as one another and thus rotate in the same rotational direction to transport the tape. Alternatively, the spools 3, 4 may be wound in the opposite sense to one another, and thus must rotate in opposite directions to transport the tape.

As described above, the printer schematically illustrated in FIG. 1 can be used for both continuous and intermittent printing applications. The controller 14 is selectively programmable to select either continuous or intermittent operation. In continuous applications, the substrate 10 will be moving continuously. During a printing cycle, the printhead 5 will be stationary but the tape will move so as to present fresh tape to the printhead 5 as the cycle progresses. In contrast, in intermittent applications, the substrate 10 is stationary during each printing cycle, the necessary relative movement between the substrate 10 and the printhead 5 being achieved by moving the printhead 5 parallel to the tape 6 and substrate 10 in the direction of arrow 17 during the printing cycle. In such a case, the roller 11 is replaced with a flat print platen (not shown) against which the printhead 5 presses the ribbon 6 and substrate 10. In both applications, it is necessary to be able to rapidly advance and return the tape 6 between printing cycles so as to present fresh tape to the printhead and to minimise tape wastage. Given the speed at which printing machines operate, and that fresh tape 6 should be present between the printhead 5 and substrate 10 during every printing cycle, it is necessary to be able to accelerate the tape 6 in both directions at a high rate and to accurately position the tape relative to the printhead. In the arrangement shown in FIG. 1 it is assumed that the substrate 10 will move only to the right as indicated by arrows 18. However, the apparatus can be readily adapted to print on a substrate travelling to the left (that is, in the opposite direction) in FIG. 1.

The driving of tape between the supply spool 3 and the takeup spool 4 is now described in further detail. In preferred embodiments of the invention, both the supply motor 12 and the takeup motor 13 are position-controlled motors.

A position-controlled motor is a motor controlled by a demanded output position. That is, the output position may be varied on demand, or the output rotational velocity may be varied by control of the speed at which the demanded output rotary position changes.

An example of a position-controlled motor is a stepper motor. A stepper motor is an example of an open loop position-controlled motor. That is, it is supplied with an input signal relating to a demanded rotational position or rotational velocity, the stepper motor being driven to achieve the demanded position or velocity. A stepper motor may also be provided with an encoder providing a feedback signal indicative of the actual output position or velocity. The feedback signal may be used to generate an error signal by comparison with the demanded output rotary position, the error signal being used to drive the motor to minimise the error. A stepper motor provided with an encoder in this manner comprises a closed loop form of position-controlled motor.

An alternative form of closed loop position-controlled motor comprises a torque-controlled motor (e.g. a DC motor) provided with an encoder. A torque-controlled motor is a motor that is controlled by a demanded output torque. The output from the encoder provides a feedback signal from which an error signal can be generated when the feedback signal is compared to a demanded output rotary position, the error signal being used to drive the motor to minimise the error.

In the present context the term "DC motor" is to be interpreted broadly as including any form of motor that can be driven to provide an output torque, such as a brushless DC motor, a brushed DC motor, an induction motor or an AC motor. A brushless DC motor comprises any form of electronically commutated motor with a commutation sensor. Similarly, the term stepper motor is to be interpreted broadly as including any form of motor that can be driven by a signal indicating a required change of rotary position.

An encoder is any form of angular position sensing device, such as an optical encoder, magnetic encoder, resolver, capacitive encoder or any other form of position sensing device. An encoder may be connected to an output shaft of a motor and used to provide a feedback signal indicating the angular position or motion of the motor output shaft.

Tape is driven between the supply spool 3 and the takeup spool 4 by controlling the motors so as to maintain tension in the tape. In general terms tension in tape travelling between the supply spool 3 and the take-up spool 4 is monitored and the supply motor 12 and the take-up motor 13 are controlled by the controller 14 so as to maintain tape tension between predetermined limits. Suitable methods for monitoring tape tension are described in further detail below.

Figure 2:
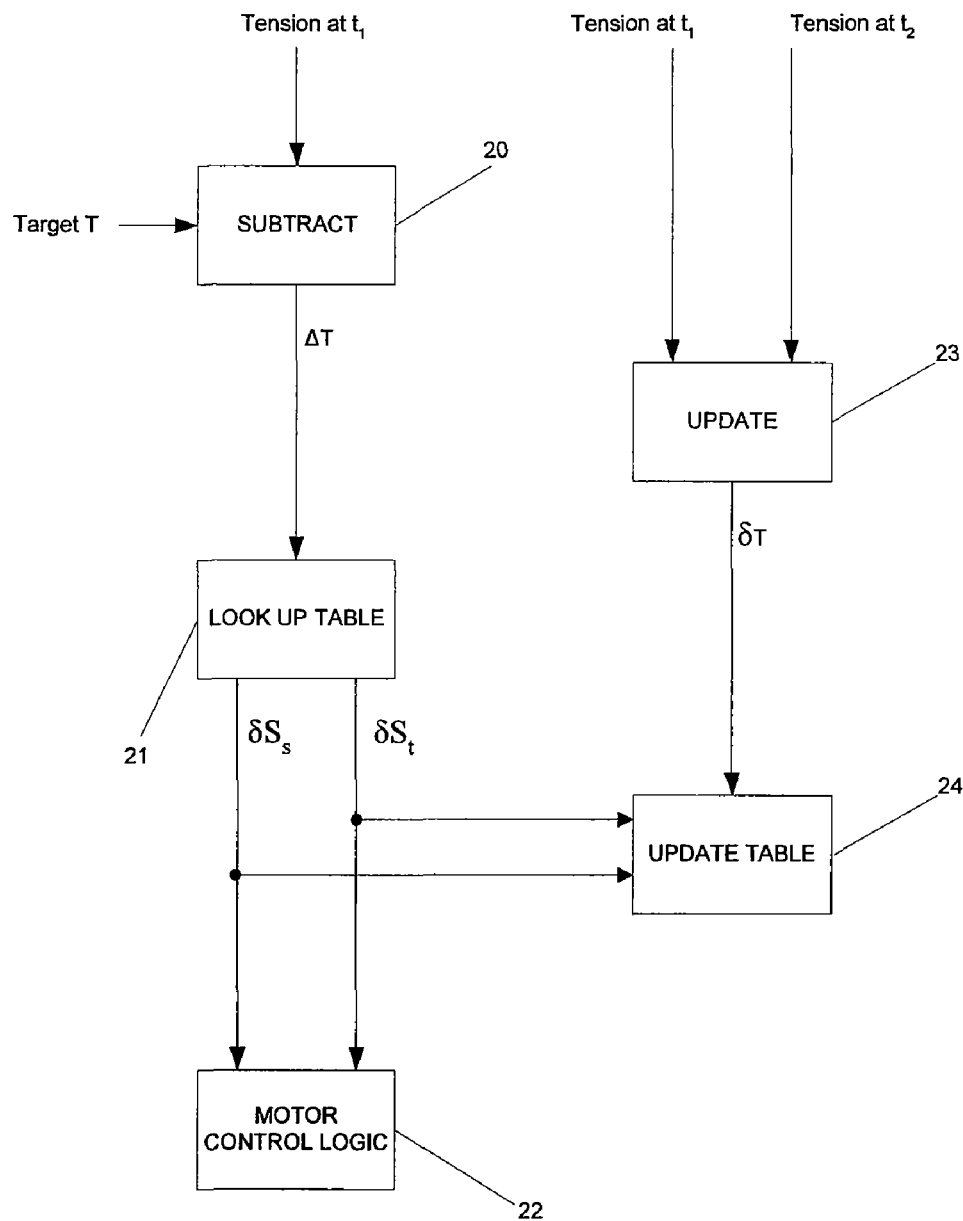
FIG. 2 is a schematic illustration of the controller of FIG. 1.

Operation of the controller is shown in FIG. 2. Tension monitored at a first time $t_1$ (hereinafter "the first tension value") is processed together with a target tension value at block 20 to generate a tension error signal $\Delta T$ by subtracting the first tension value from the target tension value. It can be seen that if the tape has excessive tension $\Delta T$ will be negative, while if the tape has too little tension, $\Delta T$ will be positive. It will be appreciated that $\Delta T$ can be defined differently in alternative embodiments of the invention. In preferred embodiments of the invention, the target tension is a range of acceptable tension values, sometimes referred to as a "deadband", in which range no tension corrections are necessary. The tension error signal indicates how far from the central value of this deadband the monitored tension value lies.

The tension error signal $\Delta T$ is used to carry out a lookup operation in a lookup table 21. Creation of the lookup table 21 is described in further detail below. The lookup table associates tension error signal values $\Delta T$ with corrections which should be applied to control of one of the two motors to adjust tension to correct for the processed tension error signal $\Delta T$. If the motors 12, 13 are stepper motors, for given spool diameters a number of steps through which each of the motors should be turned in normal operation is known, and the controller 14 is applied to turn the motors through the required number of steps, while tension remains between predetermined limits. However, when tension increases or decreases unacceptably, (i.e. outside the deadband) one of the motors is turned through a greater or lesser number of steps than normal, so as to correct for the tension error. This number of steps is determined from the lookup table 21 based upon the tension error signal $\Delta T$.

From the preceding description, it will be appreciated that the lookup table 21 outputs a correction value in response to an input tension error signal, the correction value indicating a correction to be applied to one of the two motors. The output value is provided to motor control logic 22 which is configured to appropriately energise the motors 12, 13, both to move tape normally and to correct for tape tension. Two signals are provided to the motor control logic 22 by the lookup table 21 comprising a first signal $\delta S_s$ indicating a number of steps adjustment to be applied to control of the supply motor 12 and a second signal $\delta S_t$ indicating a number of steps adjustment to be applied to control the takeup motor 13. It will be appreciated that one of the two values is zero in the described embodiment where a correction is required, while both values are zero while tension remains within predetermined limits.

It will be appreciated that as tape is transferred from the supply spool 3 to the takeup spool 4, the diameter of the supply spool 3 will decrease, while the diameter of the takeup spool 4 will increase. These changing diameters mean that as tape is transferred from the supply spool 3 to the takeup spool 4, different corrections are required to cause the same tension change. That is, while a particular correction applied to the supply motor 12 at the start of tape transport may have a particular effect on tension, once a considerable amount of tape has been transferred, that same angular correction will have a lesser effect on tension, given that the same angular correction will cause a smaller circumferential movement.

In the light of the comments made above, the lookup table is updated as tape is transported. That is, referring again to FIG. 2, it can be seen that the first tension value input to the block 20 is also input to an update block 23 together with a second tension value measured at a second time $t_2$, where the second tension value is obtained after carrying out a correction using data obtained from the lookup table 21. The first tension value is subtracted from the second tension value to generate a tension correction value $\delta T$. The value of $\delta T$ will be negative if tension has decreased and positive if tension has increased. Given this definition of $\delta T$, it can be seen that where monitored tension is too low as compared with target tension (at block 20) the tension error signal $\Delta T$ will be positive and the expected correction value $\delta T$ is also positive. Similarly, if monitored tension is too high as compared with target tension, the tension error signal $\Delta T$ will be negative, as will the expected correction.

The tension correction value $\delta T$ obtained by applying the correction is stored in an update table 24. This table stores a plurality of adjustments applied to a particular motor (each expressed as a number of steps), together with the tension correction values obtained in response to each correction, as calculated by the update block 23. Thus, for each entry in the update table 24 representing a correction applied to one of the motors, a plurality of tension correction values $\delta T$ indicating tension corrections caused by applying the respective correction to one of the motors are stored. Periodically (for example when a predetermined length of tape has passed between the spools), the values of $\delta T$ for a particular correction (i.e. a particular number of steps correction applied to one of the motors) are averaged, and the result of this average is used to overwrite the appropriate entry of the lookup table 21, that is the entry corresponding to the particular correction applied to the appropriate motor. It should be noted that in some embodiments of the invention the averaging procedure to update the lookup table 21 is only carried out if a particular correction has a predetermined minimum number of associated tension correction values. Similarly, the update table 24 will typically only store a predetermined maximum number of tension correction values associated with a particular correction applied to one of the motors (e.g., ten). When the averaging procedure has been carried out entries of the update table used in the averaging operation may be deleted, or alternatively may be retained and replaced one by one as further corrections take place. Since the tape substantially obeys Hooke's Law of elasticity where there are no or insufficient tension correction values for a particular correction in the update table 24 for use in averaging operations, a tension correction value to be associated with a particular correction when applied to one of the motors can be deduced using linear interpolation or extrapolation from appropriate data in the update table 24.

The use of the lookup table 21 to maintain tape tension has been described above, as has a process for updating entries of the table 21. It will be appreciated that the table 21 must be initially calibrated. This is carried out during a calibration phase before printing operations are carried out. As a first part of the calibration phase, the spool diameters are determined. This determination can be carried out in any convenient way. For example, one known method of monitoring the diameter of a spool of tape is based upon optical sensing comprising at least one emitter and detector pair. The emitter and detector pair is arranged such that as the diameter of the spool changes, the spool blocks that signal from the emitter to the detector, which may be detected. Such an optical spool diameter monitoring technique is disclosed in our earlier UK Patent No. GB 2369602, the contents of which are herein incorporated by reference.

An alternative method for determining tape spool diameter is disclosed in GB 2298821. Here, tape is passed around an idler roller of known diameter. The idler roller is provided with an anti-slip coating to prevent slippage occurring between the tape and the idler roller when the tape is moved. The outer diameter of the idler roller is known. Rotation of the idler roller is monitored. This is achieved by providing the idler roller with a magnetic disc having a north and south pole. Rotation of the idler roller can then be detected by an appropriate magnetic sensor. By detecting rotation of the idler roller of known diameter and knowing a number of steps through which a stepper motor has turned the diameter of a spool of tape associated with the stepper motor can be determined.

From the preceding description, it will be appreciated that it is not necessary to determine spool diameter to allow tension in tape transported between the spools to be effectively controlled. However spool diameters are required to determine steady state movement of the tape (i.e. to determine the number of steps through which the motors should be turned to move a particular linear length of tape for a printing operation). Thus, having determined spool diameters, tape can be effectively moved from the supply spool 3 to the takeup spool 4 and vice versa. Operations are also carried out to obtain data used to populate the lookup table 21. These operations involve adding or subtracting various numbers of steps from the drive signal provided to one of the motors, and recording the resulting change in tension in the tape being transported between the spools. This process allows a plurality of tension changes to be observed which are stored in the lookup table 21 alongside the motor control operation (e.g. addition or subtraction of a number of steps) causing the change. When a lookup operation is subsequently carried out as described above, the tension error signal is used to locate a tension change having the value closest to the value of the tension error signal, and the associated motor control operation is used to adjust tape tension.

It has been described above that the lookup table stores tension correction values associated with particular corrections applied to one of the motors. It will be appreciated that all possible tension correction values which may be required cannot sensibly stored in the lookup table 21. In some embodiments of the invention the process of obtaining data from the lookup table 21 involves looking up two tension correction values having closest values to the tension error signal, obtaining corrections to be applied to the motors associated with those tension correction values and linearly interpolating the corrections to be applied to the motors to obtain accurate corrections to be applied to one of the motors. Similarly, it will be appreciated that some entries in the lookup table 21 can be created by interpolating data obtained during the configuration phase.

It has been described above that it is necessary to monitor tension in the tape between the supply spool 3 and the takeup spool 4, and suitable methods for such tension monitoring are now described. These methods include directly monitoring the tension through the use of a component that contacts the tape and indirect tension monitoring. Direct tension monitoring includes, for example, a resiliently biased roller or dancing arm that is in contact with the tape, arranged such that a change in tape tension causes the roller or dancing arm to move position, the change in position being detectable using, for example a linear displacement sensor. Alternatively, tape may be passed around a roller which bears against a load cell. Tension in the tape affects the force applied to the load cell, such that the output of the load cell provides an indication of tape tension. In these cases the monitored tension is processed by the controller 14 to provide appropriate control the supply motor 12 and the take up motor 13.

If the supply motor 12 and the takeup motor 13 are both torque-controlled motors provided with encoders, tension can be monitored as follows. For one of the supply motor 12 and the takeup motor 13 the motor's angular velocity is measured using the provided encoder. Angular velocity is measured when the motor is moving with constant velocity.

By measuring motor current the motor torque can be calculated. For example, with DC brush motors the motor's torque constant would be known and the torque of the motor can therefore be calculated according to equation (1):

$$T = K_t I \qquad (1)$$

where:
T is torque;
$K_t$ is the motor torque constant; and
I is the measured current.
It is known that:

$$P = T\omega \qquad (2)$$

where:
P is power; and
ω is angular velocity.
Power values for both the supply motor 12 and take-up motor 13 can be calculated using equation (2). The tension in the tape is then proportional to the ratio of the deduced power values.

It is to be noted that the torque constants of the motors will generally vary with temperature. However, given that the ratio of deduced power values is taken, variations in temperature will be substantially cancelled out, because both motors will be at approximately the same temperature. This is because the motors are in close proximity and attached to a common base plate.

As an alternative, which is particularly applicable where the supply motor 12 and takeup motor 13 are stepper motors, a measure of power may be obtained by reading a current passing through or a voltage across a resistor in series with the power supply to drive electronics associated with each of the motors. The ratio of power supplied to the motors can be used as a measure of the tape tension. This process is now described in further detail, together with an appropriate calibration process.

Initially the take-up motor 12 is energised to remove any slack from the length of ribbon extending between the two spools. An initial estimate of the diameters of the spools is then obtained. This initial estimate can be obtained in any convenient way. For example, an optical system such as that described in our earlier UK Patent No. GB 2,369,602 mentioned above can be used.

The supply motor 12 is then energised in order to tension the ribbon extending around the supply spool 3. The take up motor 13 is then driven so as to draw ribbon from the supply spool 3, the supply spool motor 12 being deenergized. The rotational movement taken by the motor driving the take-up spool 4 is monitored. The other motor is not stopped, but generates a back-emf resulting in the generation of pulses that are counted. After a few turns of the spools the rotational movement of the take-up motor 13 and the number of pulses generated by the supply motor 12 are counted and the counted numbers are used to establish the ratio between the two diameters. The tape is then brought to a controlled halt. Both motors are decelerated in a controlled manner to avoid overrun. Thus the supply spool motor 12 is driven by pulses to cause deceleration. The application of deceleration pulses to the supply spool motor 12 in synchronism with motor rotation is achieved by monitoring the back-emf generated in that motor, and then energising the motor at an appropriate time to apply a decelerating torque. A number of rotations of the take up spool 4 are required to minimise the chance of any tails of ribbon extending from the spools obstructing optical paths of a scanning arrangement used to determine initial spool diameters, the arrangement being as described in our earlier UK Patent referred to above.

A further optical scan is then performed in both directions to determine the radius of the take up spool 4 whilst that spool is stationary. An optical scan is then repeated as the spool is rotated in 30° increments around the motor shaft by turning the motor through an appropriate rotational movement, that appropriate movement being a constant. This builds up a map of the dimensions of the spool (which may not be perfectly circular) and this map is used to calculate the average radius for each spool for the arc that each will rotate in each ribbon feed and further use these radii to calculate variations in diameter around the spool axes. This makes it possible to accurately determine the circumference of each spool and the effect of a predetermined rotational movement of the motor driving that spool. For example the different calculated radii can be used to calculate the rotational movement required by each motor to drive the spools in an appropriate manner so as to feed the ribbon a predetermined distance. These radii and rotational movements may then be used in tension monitoring calculations such as those described below.

The same optical scan procedure is then performed in both directions to measure the radius of the supply spool 3. This information is then combined with the previously calculated ratio of spool diameters to give an accurate set of data related to the spool diameters and shapes. Tape fed from the supply spool 3 to the take up spool 4 is then rewound back on to the supply spool 3 so as to avoid ribbon wastage.

Stepper motors generally comprise two quadrature-wound coils and current is supplied in a sequence of pulses to one or both of the coils and in both senses (positive and negative) so as to achieve step advance of the motor shafts. In order to achieve a reasonable performance despite the inherent electrical time constant of these coils it is well known to overdrive stepper motors by applying a voltage that is much larger than the nominal rating of the motor and to pulse width modulate this voltage when the desired motor current is reached. For example, with a 3.6 volt motor capable of taking say 2 amps, a voltage of 36 volts may be applied. This results in a very rapid rise in current through the motor, typically in a few tens of micro seconds. Given such overdriving of the supply voltage, relatively short periods of supply voltage application are separated by relatively long periods during which no supply voltage is applied. As a result current from the supply to the motors is very far from smooth. In addition, even when a motor is operating with zero load relating to the function that it performs (equating to zero tension in the printer ribbon), the supply current to the motor will be a function of various factors such as the speed of rotation of the motor, the particular characteristics of that motor (efficiency etc.), and the particular characteristics of the motor drive circuitry (gain and offset variances). It is necessary therefore to calibrate the motors to take account of current variation related to these factors rather than motor load.

Where DC motors are used, it is known to overdrive such motors momentarily e.g., with a 3.6V DC motor capable of taking say 6 amps, a voltage of 36V may be applied.

The motors are calibrated by driving each of them in zero-load conditions at each of a series of different speeds. This will generally cover the range of tape transport speeds required for tape advancement, which range generally being from 100 mm per second to 1000 mm per second tape transport speed. This process is repeated a number of times, for example twenty times, and the average result is used to calculate a motor calibration factor x for each speed, and for each motor. The following relationship is used:

$$x = N/V$$

where:
 x is the calibration factor for the motor at the given speed;
 V is the average measured motor operation value at the given speed; and
 N is a constant normalisation or scaling factor.

From the above for each motor a series of values x is calculated for each of the predetermined speeds. When the apparatus is in use, for a given speed one of the values x is selected for use in the calculation of ribbon tension, or a value for x is calculated for the given speed by interpolation from the two values of x for the predetermined speed closest to the given speed.

Figure 3:
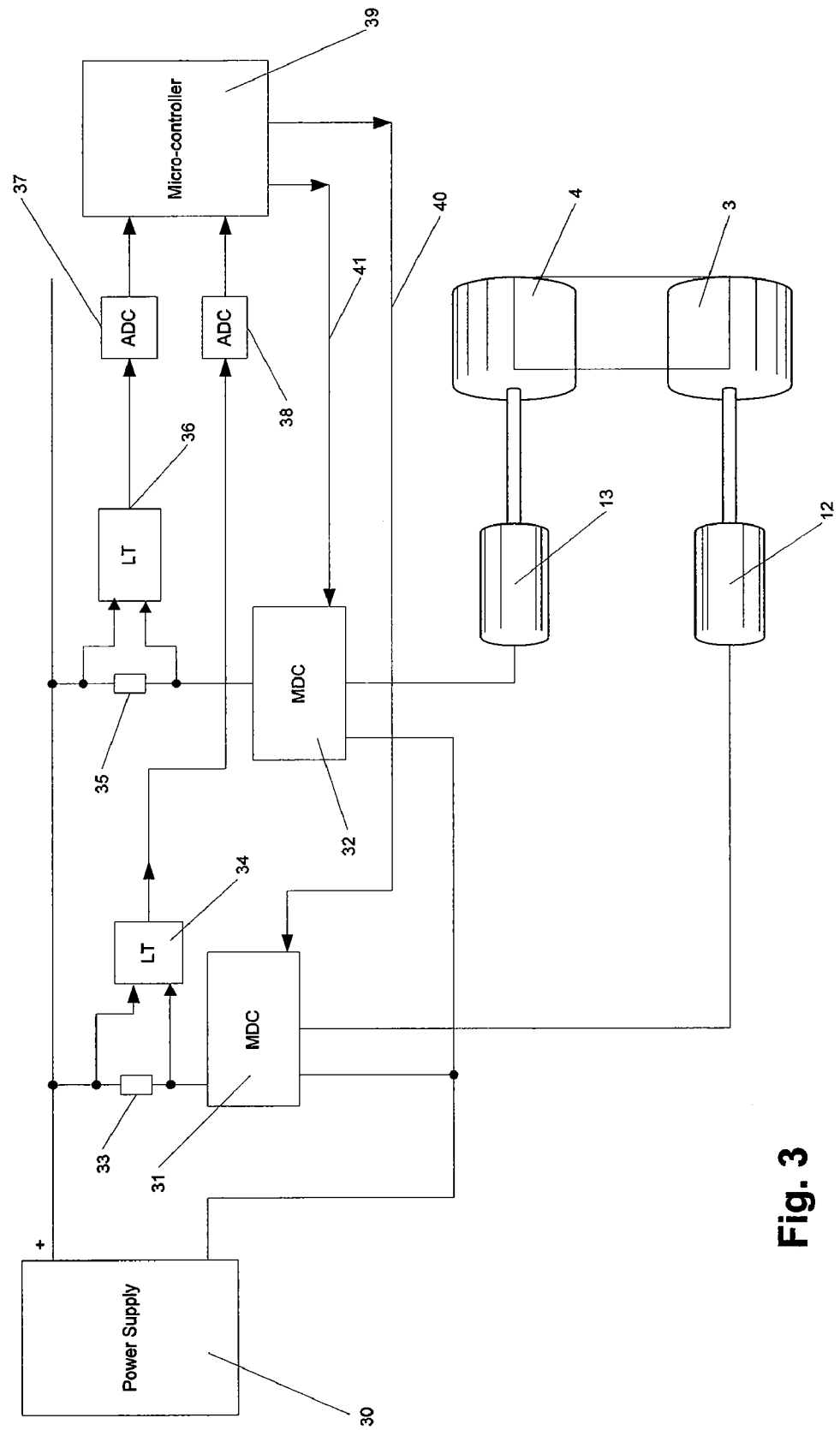
FIG. 3 is a schematic illustration of a motor control circuit suitable for use in the tape drive of FIG. 1.

FIG. 3 illustrates the calculation of the values V both during motor calibration and in subsequent ribbon tension control. Referring to FIG. 2, a regulated power supply 30 energises a first motor drive circuit 31 and a second motor drive circuit 32. Current from the supply 30 to the motor drive circuit 31 is delivered through a low resistance resistor 33, the potential developed across the resistor 33 being applied to a level translator 34. Similarly, current to the motor drive 32 is delivered through a low resistance value resistor 35 and the voltage developed across that resistor is applied to a level translator 36. The outputs of the level translators 34 and 36 are applied to analogue to digital converters 37 and 38 the outputs of which are applied to a micro controller 39. The micro controller delivers an output 40 to the first motor drive 31 and an output 41 to the second motor drive 32. The motor drives energise the supply motor 12 driving the supply spool 3 and the take-up motor 13 driving the take-up spool 4.

During motor calibration, no spools are mounted on the outputs of the motors 12, 13. For a given speed for each motor the outputs of the ADC's 37 and 38 are recorded such that x and V for each motor at each of the preselected speeds is known. Those values are then used as described below to enable direct monitoring of ribbon tension in the ribbon between the spools 3 and 4, these spools having been mounted on the output shafts of the stepper motors 12 and 13.

The formulas used for tension calculation are as follows, assuming that motor 13 is pulling and motor 12 is pushing:

$$V_1 x_1 = (N + r_1 T x_1) f(\text{Temp}) \quad (3)$$

$$V_2 x_2 = (N - r_2 T x_2) f(\text{Temp}) \quad (4)$$

where:
$V_1$ is the output of ADC 28 given a selected constant step-rate ribbon feed;
$V_2$ is the output of ADC 27 during ribbon feed;
$r_1$ is the radius of the spool 34;
$r_2$ is the radius of the spool 35;
$x_1$ is the calibration factor for motor 32 for the selected constant speed;
$x_2$ is the calibration factor for motor 33 for the speed of motor 33;
N is the scaling factor used during motor calibration;
T is the ribbon tension; and
f(Temp) is a temperature-related function.

Temperature variations which will affect the measured values $V_1$ and $V_2$ will generally affect both motors to a similar extent. Therefore by dividing equation (3) by equation (4) the functions f(Temp) will cancel out. The equation can therefore be resolved to derive a measure of tension t as follows:

$$t = N((V_1/x_2) - (V_2/x_1))/(V_2 r_1 + V_1 r_2) \quad (5)$$

Thus for any given speed for the motors, the appropriate calibration factors $x_1$, $x_2$ can be looked up and used to derive a measure of the ribbon tension t.

In alternative embodiments of the invention, equations (3), (4) and (5) may be modified to take account of motor speed, or where stepper motors are used, to take account of step rate.

In an alternative embodiment of the invention, tension is monitored using an alternative method. At rest or when the tape is travelling at a constant velocity, the spools may be held by a known current. Given that for a torque-controlled motor of the type described above current is proportionally related to torque by the motor's torque constant, the torque provided by each motor can be determined.

Tension can then be calculated by dividing the torque value by the radius of each spool. Given that each value should ideally be equal, the obtained values can be averaged to improve accuracy.

Alternatively, the acceleration or deceleration of each spool can be measured using the encoders.

It is known that:

$$A = K_t/J \quad (6)$$

where:
A is the acceleration per unit of current;
$K_t$ is the torque constant of the motor; and
J is the moment of inertia of the spool of tape, which can be calculated from knowledge of the diameter of the spool of tape and knowledge of tape density.

Therefore:

$$A' = A/I_J \quad (7)$$

where:
A' is the measured acceleration; and
$I_J$ is the current producing that acceleration.
It can be seen that:

$$I_m = I_J + I_T \quad (8)$$

where $I_m$ is the current provided to the motor; and
$I_T$ is the current providing tension in the tape which can be calculated from a knowledge of ribbon density and spool diameter.

From equations (6), (7) and (8) it can be deduced that:

$$I_m - A'/(K_t/J) = I_T \quad (9)$$

Given that $I_m$ and A' can be measured, and given that $K_t$ and J are known, the tension in the tape can be calculated. Specifically, the tension in the tape can be calculated using equation (10):

$$t = (I_T K_T)/R \quad (10)$$

where:
t is tape tension; and
R is spool radius.

It will be appreciated that if a particularly low tension reading is calculated by any of the above methods, this can be taken by the control system as indicating a fault condition, for example ribbon breakage, or the ribbon becoming so slack that the system is most unlikely to be able to effect adequate control. In such circumstances, the control system can output a "broken ribbon" predetermined low limits, such that when the measured tension falls below this limit, the control system can halt the printing process and assert appropriate fault outputs and warning messages. Thus the system can offer valuable "broken ribbon" detection without the need for additional sensing arrangements.

In the preceding description it has been explained that a correction to adjust tension is applied to one of the supply motor 12 and the takeup motor 13. It will be appreciated that in alternative embodiments of the invention the necessary correction can be achieved by modifying the control signal (e.g. a number of steps) provided to both of the supply motor 12 and the takeup motor 13.

Where references are made to computing an average in the preceding description, such references should be construed as references to any appropriate computation producing a value from a plurality of values. Thus while conventional "averaging" operations such as computation of a mean, median or mode value are contemplated, so are other techniques such as, for example various computations applying appropriate weightings to the values.

Further modifications and applications of the present invention will be readily apparent to the appropriately skilled person from the teaching herein, without departing from the scope of the appended claims.

What is claimed is:

1. A thermal transfer printer for selectively transferring a meltable ink material carried on a tape to a substrate for printing an image on the substrate, the printer comprising:
   two spool supports for two spools of tape carrying ink material, with the tape being wound on the spools and with a span of tape being held in tension between the spools, the tape spools being carried on and driveable by respective spool supports with a region of unused tape to be made available for each image to be printed on the substrate;

a print head positioned at the span of tape between the tape spools, the print head being mounted for selective movement between an extended position adjacent the span of tape between the spools and a retracted position spaced apart from the span of tape between the tape spools and comprising heating elements selectively energizable for transferring ink material on the span of tape between the tape spools to the substrate when the print head is moved into contact with the tape while the tape is in contact with the substrate to print an image, wherein the print head is moved to its retracted position during each time period between each successive printing of adjacent images on the substrate;

a tape drive for selectively transporting tape between the spools of tape comprising two motors, each motor driving a spool of tape via its respective spool support;

the tape drive further comprising a controller operatively associated with the motors and configured to control the energization of the motors to transport the tape in at least one direction between the spools, and to control energization of the motors to control a level of tension in the span of tape extending from one spool of tape to the other spool of tape;

a monitor configured to monitor a parameter indicative of tension in the span of tape extending from one spool to the other spool of tape;

a memory configured to store a plurality of tension correction data values, with the tension correction data values being associated with tape tension error values;

the controller further being configured to:

(a) respond to a first monitored level of tension in the span of tape indicating that tension in the tape is not at an acceptable target level of tension by generating a tape tension error value, (b) access the memory to retrieve a tension correction data value corresponding to the tape tension error value, (c) control energization of the motors based at least in part on the tension correction data value to adjust the tension in the tape; and (d) respond to a second monitored level of tension in the span of tape after said energization of the motors by modifying at least one tension correction data value stored in memory based at least in part on a comparison of the first monitored level of tension in the span of tape and the second monitored level of tension in the span of tape.

2. The thermal transfer printer of claim 1, wherein at least one of said motors is a position-controlled motor.

3. The thermal transfer printer of claim 2, wherein at least one of said motors is a stepper motor.

4. The thermal transfer printer of claim 2, wherein each of said tension correction data values represents an angular position adjustment for at least one of the motors.

5. The thermal transfer printer of claim 4, wherein said angular position adjustment is a number of steps of the respective motor.

6. The thermal transfer printer of claim 2, wherein the controller is configured to control tension in the span of tape by controlling energization of one of the motors to rotate to a commanded angular position and energization of the other motor to hold steady against the tension in the tape.

7. The thermal transfer printer of claim 2, wherein the controller is configured to control tension in the span of tape by controlling energization of both motors to rotate to respective commanded angular positions.

8. The thermal transfer printer of claim 1, wherein said acceptable target level of tension in the span of tape comprises a range of tension values.

9. The thermal transfer printer of claim 1, wherein the controller is configured to control the motors to transport tape in both directions between the spools.

10. The thermal transfer printer of claim 1, wherein the monitor is configured to monitor the electrical power supplied to at least one motor and wherein the controller is configured to determine tension in the tape based at least in part on a monitored level of electrical power.

11. The thermal transfer printer of claim 1, wherein the monitor is configured for determining a parameter indicative of the diameter of at least one of the spools of tape mounted on the spool supports.

12. The thermal transfer printer of claim 1, wherein the acceptable target level of tension in the span of tape comprises a nominal tape tension level.

13. The thermal transfer printer of claim 1, wherein the controller is configured to generate a tension adjustment value based on the comparison of the first and second monitored levels of tension in the span of tape.

14. The thermal transfer printer of claim 13, wherein the controller is configured to store data indicative of a plurality of tension adjustment values associated with tension correction data values used to perform a plurality of said energizations of the motors associated with tension adjustment values.

15. The thermal transfer printer of claim 14, wherein the controller is configured to modify a tension correction data value based at least in part on a computed average of said tension adjustment values.

16. The thermal transfer printer of claim 1, wherein said controller is configured to initiate a plurality of said energizations of the motors associated with tension correction data values, wherein each said energization of the motors results in an adjustment of tension in the span of tape and the controller being configured to assign a tension adjustment value to a respective tension correction data value to populate said memory.

* * * * *